W. I. WIEDEMEYER.
MANURE SPREADER.
APPLICATION FILED DEC. 21, 1908.

922,830.

Patented May 25, 1909.
2 SHEETS—SHEET 1.

Witnesses.
F. C. Dahlberg.
A. G. Hague.

Inventor:
Wm. I. Wiedemeyer.
by Orwig & Lane attys

W. I. WIEDEMEYER.
MANURE SPREADER.
APPLICATION FILED DEC. 21, 1908.
922,830.
Patented May 25, 1909.
2 SHEETS—SHEET 2.
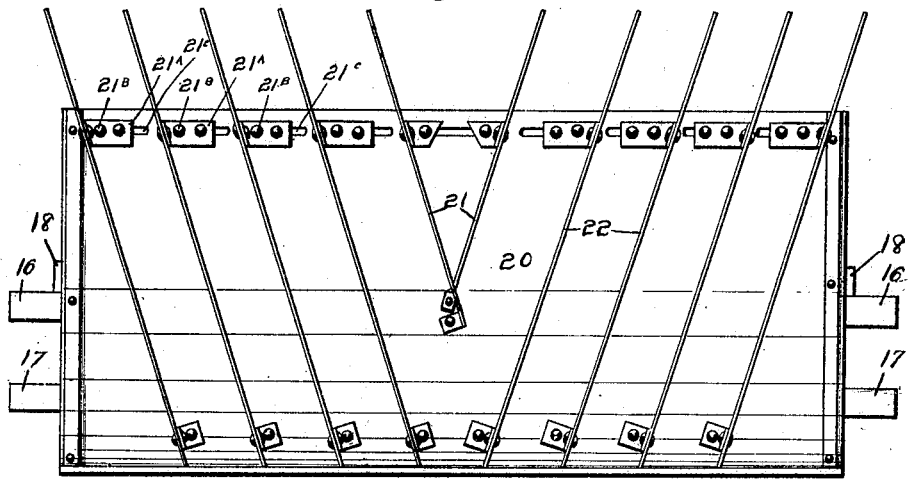
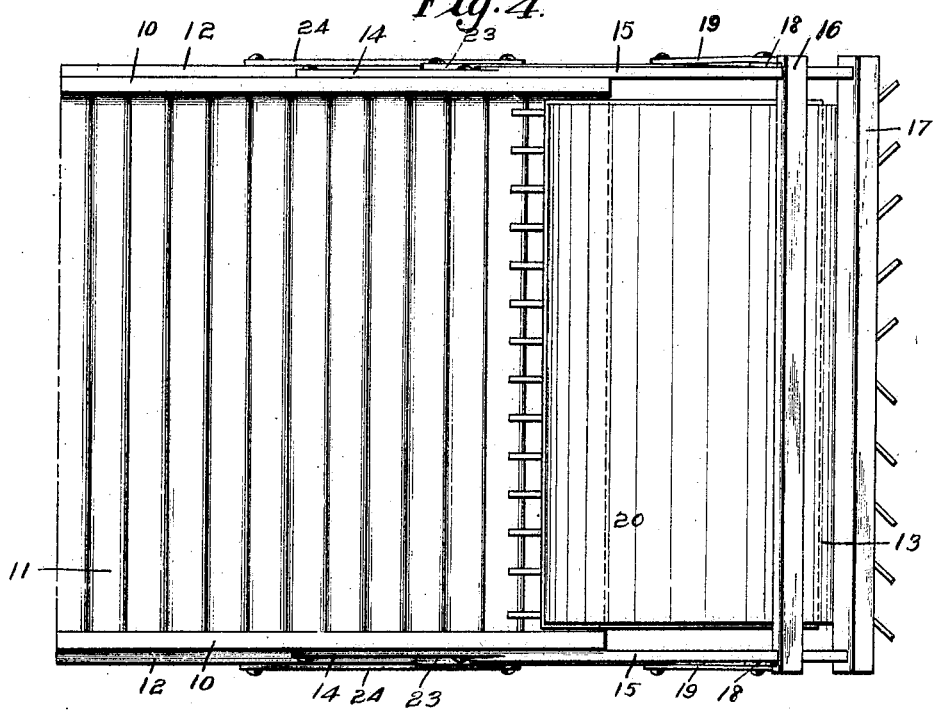
Witnesses.
F. C. Dahlberg.
A. G. Hague
Inventor:
Wm. I. Wiedemeyer
by Orwig & Lane Atty's

UNITED STATES PATENT OFFICE.

WILLIAM I. WIEDEMEYER, OF CARROLL, IOWA, ASSIGNOR OF ONE-HALF TO J. RUGE, OF CARROLL, IOWA.

MANURE-SPREADER.

No. 922,830.  Specification of Letters Patent.  Patented May 25, 1909.

Application filed December 21, 1908. Serial No. 468,665.

*To all whom it may concern:*

Be it known that I, WILLIAM I. WIEDE-MEYER, a citizen of the United States, residing at Carroll, in the county of Carroll and State of Iowa, have invented a certain new and useful Manure-Spreader, of which the following is a specification.

The object of my invention is to provide a device designed to be used in the nature of an attachment to be applied to manure spreaders of the class containing rotary spreading cylinders, said device being so arranged that when in one position, it will present a smooth side toward the interior of the body of the manure spreader to prevent manure therein from moving to position in contact with the spreading cylinder, and when in its other position, it will stand over and in the rear of the spreading cylinder and receive the first impact of the manure discharged from the spreader, said device being provided with sharpened deflecting blades on its under side, in position to be engaged by the manure when discharged by the spreading cylinder, to thereby break up the particles of the manure and distribute them rearwardly and laterally, to thereby cover a comparatively wide path.

A further object is to provide a device of this kind having deflecting blades so arranged that their rear end portions may be adjusted laterally to thereby distribute the material over a comparatively wide path or over a comparatively narrow path as the conditions may require.

My invention consists in the construction, arrangement and combination of the various parts of the device, whereby the objects contemplated are attained, as hereinafter more fully set forth, pointed out in my claims and illustrated in the accompanying drawings, in which—

Figure 1:
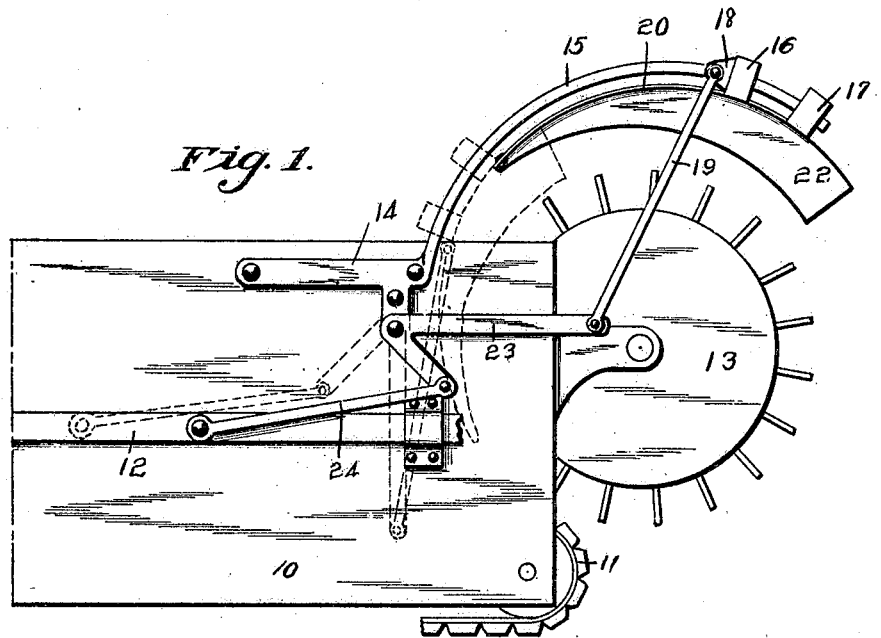
Figure 2:
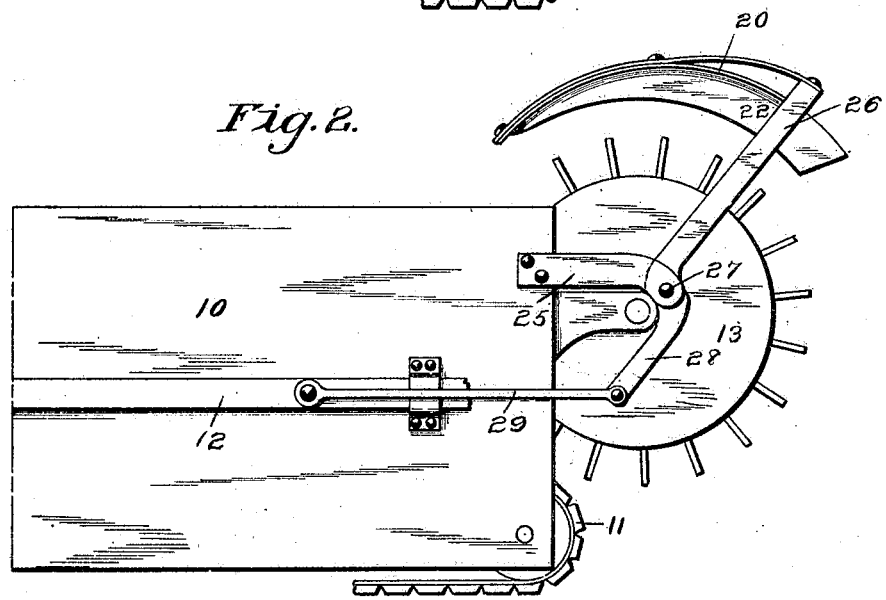

Figure 1 shows a side elevation of a part of the rear portion of a manure spreader with my improvement applied thereto. The dotted lines in said figure show the position of the combined spreader and partition wall when in use as a partition wall. Fig. 2 shows a similar view illustrating a modified form of the invention. Fig. 3 shows an inverted plan view of the spreader and partition wall detached, and Fig. 4 shows a top or plan view of the device shown in Fig. 1.

Referring to the accompanying drawings, I have used the reference numeral 10 to indicate the body of a manure spreader, and 11 an endless conveyer or apron therein. At one side of the wagon body is a rod or slide bar 12, capable of forward and rearward movement. Mounted in the rear of the wagon bed is a spreading cylinder 13. All of the parts before described are of ordinary construction now in general use, and the slide bar 12 usually connected with a lever at the front and its rear end, is usually connected with means for throwing the movable apron and spreading cylinder into and out of gear. I preferably employ this same slide bar in connection with my attachment, although this is not necessary, and a separate slide bar may be provided for the purposes of my invention.

My improved attachment is one that may be readily and quickly applied to any manure spreader of the type mentioned, and consists of two brackets 14, each designed to be secured to one side of the manure spreader near its rear upper corner. On said bracket is a segmental arm 15 extended upwardly and rearwardly and then downwardly, and preferably arranged substantially concentric with the spreading cylinder. Slidingly mounted upon said segmental arms 15 are two cross bars 16 and 17. The cross bar 16 is provided near its ends with the brackets 18, and to these brackets I have pivoted the links 19. Secured to the cross bars 16 and 17 is the combined spreader and partition wall, composed of a segmental sheet metal body portion 20, fixed to the cross bars 16 and 17, and having on its under surface a series of blades. The two central blades are indicated by the numeral 21 and are pivotally connected to the central portion of the part 20, and they extend rearwardly and outwardly away from each other to points some distance beyond the rear end of the part 20. Near the rear end of each of said blades is a bracket 21ᵃ, having a bolt 21ᵇ extended through it, and also through a slot 21ᶜ in the part 20. By these means the said blades may be adjusted laterally at their rear ends so that the inclination of the blades from a central longitudinal line through the spreader may be varied to suit the requirements. At equal distances throughout the remainder of the part 20 are the blades 22 arranged parallel with the blades 21, those on one side being parallel with one of the blades 21, and those on the other side being parallel with the other one of said blades. These blades 22 are pivotally connected at their forward ends to the part 20 and are adjustably connected at the rear ends with the part 20 in the same manner as the blades 21. The blades 22 extend from the front edge of the part 20 to a point spaced apart from the rear of the part 20, and the under surfaces of all of said blades 21 and 22 are arranged on curved lines, being slightly further separated from the spreading cylinder at their forward ends, than at their rear, as clearly shown in Fig. 1. The said blades are also so arranged with relation to the spreading cylinder 13, that as material is carried up by said spreading cylinder and thrown from it, it will strike upon the said blades at or near the central portions thereof, and said blades will then tend to cut or break up the large particles of manure, and they will also tend to spread and distribute the manure evenly over a path somewhat wider than it would be spread by the cylinder itself.

Mounted upon the bracket 14 on each side is a bell crank lever 23. This lever has the arm 18 pivoted to one end, and pivoted to its other end is a link 24 which is extended forwardly and pivoted to the slide bar 12. By this arrangement it is obvious that a movement of the slide bar 12 will result in moving the combined spreader and partition wall on the segmental arms 15. When at its forward limit of movement, it will serve as a partition wall, as shown by dotted lines in Fig. 1, and its smooth surface will be presented toward the central portion of the wagon bed, so that when a load of material is placed therein, it will be held in front of the partition wall and cannot move rearwardly in engagement with the spreading cylinder. Then when the spreader and partition wall is moved to its rearward limit, as shown by solid lines in Fig. 1, it will permit the load to move to position in engagement with the cylinder, and will also break up the manure and spread it laterally.

By having the blades 21 and 22 so arranged that they may be adjusted to various angles, it is obvious that they may be made to spread the material over either a narrow or wide path as the conditions may require. This feature is of great advantage in connection with a device of this kind, for the reasons that the conditions of the material being used will vary to a great extent and also the condition of the land upon which the material is to be applied varies greatly, and hence the operator can by simple adjustment of the blades adapt the machine to the requirements of use.

It is obvious that the device is of very simple and inexpensive construction, and that its structure is such that it may be readily, quickly and easily attached to or removed from any of the ordinary manure spreaders now in general use, and none of the parts of said spreaders need be altered or changed in any way to adapt them for use in connection with my attachment.

In the modified form shown in Fig. 2, I have provided brackets 25 attached to the rear of the wagon bed, and extended rearwardly and downwardly, and the combined spreader and partition wall is fixed to an arm 26 on each side, which arm is fulcrumed at 27 on the bracket 25, and has an extension 28 connected by a link 29 with the slide bar 12. This modified form operates in substantially the same manner as my preferred form before described, but can be used only in connection with certain kinds of manure spreaders, for the reason that the brackets 25 and the arms 26 are likely to interfere with some of the mechanism on certain manure spreaders, for operating the spreading cylinder. It however, has the same advantages in regard to serving as a partition wall, and to cutting and breaking up and distributing laterally the manure discharged from the spreading cylinder.

I claim as my invention:

1. An attachment for manure spreaders comprising two brackets designed to be secured to a wagon bed, and having segmental arms connected therewith and extended upwardly and rearwardly, and then downwardly, two cross bars slidingly mounted on said segmental arms, a segmental plate fixed to said cross bars, blades fixed to the under surface of the segmental plate and extended rearwardly and outwardly from the longitudinal center of said plate, a bell crank lever fulcrumed to each of said brackets, a link for connecting one end of each bell crank lever with one of the cross bars, a link attached to the other end of said bell crank lever, and a slide bar connected with said latter link, for the purposes stated.

2. The combination with a manure spreader having a wagon bed and a spreading cylinder, and slide bars at the sides thereof, of a bracket attached to each side of the manure spreader, segmental arms extending upwardly and rearwardly, and then downwardly from said brackets, two cross bars slidingly connected with said arms, a segmental plate fixed to said cross bar, said parts being so arranged that when the cross bars are at their forward limit of movement, they will stand in position near the top of the wagon bed, and the lower end of the segmental plate will be in position near the bottom of the wagon, and spaced apart from the front of the spreading cylinder, a series of blades fixed to the under surface of the segmental plate, extended rearwardly and outwardly from the longitudinal center thereof to points spaced apart from the rear end of said segmental plate, said blades being nearer the spreading cylinder at their rear ends than at their front ends, a bell crank lever fulcrumed to each of said brackets, a link connected with each bell crank lever and pivoted to one of the cross bars, and a link connected to the other end of each bell crank lever and pivoted to one of the cross bars, and a link connected to the other end of each bell crank lever and pivoted to the adjacent slide bar, for the purposes stated.

Des Moines, Iowa, December 4, 1908.

WILLIAM I. WIEDEMEYER.

Witnesses:
  JULIUS RUGE,
  M. B. GOLDIZEN.